United States Patent
Gfeller et al.

(10) Patent No.: US 7,289,815 B2
(45) Date of Patent: Oct. 30, 2007

(54) TRANSPONDER SUBSYSTEM FOR SUPPORTING LOCATION AWARENESS IN WIRELESS NETWORKS

(75) Inventors: Fritz Gfeller, Bonstetten (CH); Walter Hirt, Wettswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/524,368

(22) PCT Filed: Aug. 6, 2003

(86) PCT No.: PCT/IB03/03703

§ 371 (c)(1),
(2), (4) Date: Oct. 17, 2005

(87) PCT Pub. No.: WO2004/017569

PCT Pub. Date: Feb. 26, 2004

(65) Prior Publication Data

US 2006/0105785 A1    May 18, 2006

(30) Foreign Application Priority Data

Aug. 15, 2002   (EP) .................................. 02018349

(51) Int. Cl.
*H04Q 7/20* (2006.01)
(52) U.S. Cl. .............................. 455/456.1; 455/404.2; 455/414.1; 340/572.1; 342/357.09
(58) Field of Classification Search ............. 455/456.1, 455/404.2, 414.1; 430/572.1; 342/357.09, 342/126, 450
See application file for complete search history.

(56) References Cited

U.S. PATENT DOCUMENTS

| | | | | |
|---|---|---|---|---|
| 5,365,516 A | * | 11/1994 | Jandrell | 370/335 |
| 5,926,133 A | * | 7/1999 | Green, Jr. | 342/363 |
| 6,061,614 A | * | 5/2000 | Carrender et al. | 701/33 |
| 6,072,421 A | * | 6/2000 | Fukae et al. | 342/42 |
| 6,717,507 B1 | * | 4/2004 | Bayley et al. | 340/5.1 |
| 7,030,811 B2 | | 4/2006 | Goren | |
| 7,107,065 B2 | * | 9/2006 | Overy et al. | 455/456.2 |
| 7,113,792 B2 | * | 9/2006 | Glazko et al. | 455/455 |
| 7,123,152 B2 | * | 10/2006 | Contractor | 340/573.1 |
| 2002/0065607 A1 | * | 5/2002 | Kunzeman et al. | 701/213 |
| 2003/0093663 A1 | * | 5/2003 | Walker | 713/150 |

FOREIGN PATENT DOCUMENTS

| | | |
|---|---|---|
| EP | 1118837 A2 | 12/2000 |
| WO | WO9835524 | 2/1998 |
| WO | WO98/35524 | 8/1998 |
| WO | 1118837 A3 | 12/2000 |
| WO | WO0129574 A2 | 4/2001 |
| WO | WO0129574 A3 | 4/2001 |
| WO | WO02035766 A2 | 5/2002 |
| WO | WO02035766 A3 | 5/2002 |

* cited by examiner

*Primary Examiner*—Nghi H. Ly
(74) *Attorney, Agent, or Firm*—Louis P. Herzberg

(57) ABSTRACT

The present invention is related to an apparatus and method for determining the location of a communication device within a wireless network in order to provide a geolocation functionality to the communication device participating under an access protocol of a wireless local-area network (WLAN) infrastructure such as IEEE 0.802.11 or Hiperlan. The apparatus comprises at least two transponder units for communicating with the communication device when the communication device is situated in a coverage area of the wireless network and a processing unit for deriving the location of the communication device within the coverage area in dependence on information received from the transponder units.

15 Claims, 4 Drawing Sheets

TRANSPONDER SUBSYSTEM FOR SUPPORTING LOCATION AWARENESS IN WIRELESS NETWORKS

CROSS REFERENCE AND PRIORITY

This application filed under 35 USC 371, is cross-referenced with, and claims priority from, International Patent Application PCT/IB2003/03703 filed on Aug. 6, 2003, and published in English with Publication No. WO2004/017569 on Feb. 26, 2004 under PCT article 21(2), which in turn claims priority of EP 02018349.7, filed on Aug. 15, 2002.

TECHNICAL FIELD

The present invention is related to an apparatus and method for determining the location of a communication device within a wireless network in order to provide a geolocation functionality to the communication device participating under an access protocol of a wireless local-area network (WLAN) infrastructure such as IEEE 802.11 or Hiperlan. More particularly, the invention allows to determine the location of mobile stations and tagged objects within a coverage area of the wireless network.

BACKGROUND OF THE INVENTION

The proliferation of mobile computing devices and wireless local-area networks, also abbreviated to as WLAN's, has created a growing interest in accurate location-aware systems and services.

Of particular interest is the upgrading of existing WLAN infrastructure originally designed for supporting wireless data traffic with a functionality for also enabling location-aware services. The operation (PHY-layer and MAC-layer) of these WLAN's, such as IEEE 802.11 or Hiperlan, is standardized and has originally been designed for wireless data traffic only. Especially WLAN's based on the IEEE 802.11x standard are proliferating and it is highly desirable to add features providing added value. It is therefore of interest to provide a geolocation functionality which does not contradict with the set of standards.

The Global Positioning System (GPS) and wireless enhanced 911 (E-911) mobile phone services address the issue of location finding. However, these technologies cannot provide accurate indoor geolocation, which has its own independent market and technical challenges.

For the determination of a mobile station's location the acquisition of measurement parameters such as received signal strength (RSS) and/or time delay (TD) from a wireless frame exchange between a mobile station and access points can be used.

In their article, Paramvir Bahl and Venkata Padmanabhan, "RADAR: An In-Building RF-based User Location and Tracking System", IEEE INFOCOM, Israel, March 2000, pp. 775-784, suggest the use of a set of access points (AP) with different locations within a desired location range for providing RSS parameters to a mobile station and to determine the estimated location with triangulation methods using a channel attenuation model.

The prior art also shows pure software solutions where a set of at least three AP's per desired location range is used to provide RSS data for processing with the signature method.

Although an obvious choice, using a multitude of AP's as responding stations within the same location range to provide distance estimates to mobile stations has several drawbacks with respect to WLAN infrastructure installation, data throughput performance, as well as cost and application possibilities of the additional geolocation functionality. Referring to the terminology used in the IEEE 802.11 WLAN standard, an AP provides wireless access within a dedicated area or cell for data traffic to and from stations that are associated with the AP thus forming a basic service set (BSS). Another function of the AP is to coordinate routing data within a distribution system (DS), which in turn is connected to other AP's serving different BSS's, and to a portal for connecting to conventional wired LAN's. At installation time the physical placement of AP's within a building should be carefully chosen to optimize radio coverage and to minimize potential interference between AP's operating on the same or adjacent channels. There is a conflict between the physical placement of an AP serving one BSS within its coverage range, and the requirement for several stations responding to location sensing (by using additional AP's according to prior art solutions) within the same coverage range. The situation is more acute if the WLAN is constituted of several BSS's forming an extended service set (ESS) to cover a given site or campus. Here, the cell planning and frequency allocation with one AP per cell to form an ESS conflicts even more with the suggested use of at least three AP's at locations optimized for best location sensing results. Furthermore, if AP's within audible range are chosen to operate on the same channel, severe mutual interference will occur which may preclude the introduction of future protocol extensions addressing quality of service (QoS) such as IEEE 802.11e.

It is a disadvantage that prior to communicating with an AP, stations are required to authenticate and associate/reassociate themselves, which requires several frame exchanges between station and AP thus causing substantial protocol overhead. With additional AP's used for assisting location sensing the protocol overhead becomes even greater. It is a further disadvantage of the prior art that the stations support the full protocol stack to communicate with the set of AP's. This demands a full set of hardware and software (WLAN adapter card, host computer), thus precluding applications demanding very inexpensive and power-saving hardware such as wireless tags for locating objects.

From the above it follows that there is still a need in the art for an improved determination of the location of a communication device within a wireless network. Moreover, the determination of the position location of a station or tag with an accuracy of a few meters is desired with cost-effective stations or tags.

SUMMARY AND ADVANTAGES OF THE INVENTION

In accordance with the present invention, there is provided an apparatus for determining the location of a communication device within a wireless network. The apparatus comprises at least two transponder units for communicating with the communication device when the communication device is situated in a coverage area of the wireless network and a processing unit for deriving the location of the communication device within the coverage area in dependence on information received from the transponder units.

In accordance with another aspect of the present invention, there is provided a method for determining the location of a communication device within a wireless network. The method comprises the steps of arranging at least two transponder units for communicating with the communication device when the communication device is situated in a coverage area of the wireless network, receiving information from the transponder units, and deriving the location of the communication device within the coverage area in dependence on the received information.

In general, a separate and autonomous subsystem of transponder units is employed which allows decoupling the conflicting requirements for the physical placement of an access point with optimized desired coverage area, and the placement of location transponder units within the same coverage area for achieving optimum location-sensing results. Received signal strength (RSS) and/or time delay (TD) data from the subsystem of independent stationary location transponder units are gathered and processed for determining the local position of a mobile station or tagged object, i.e. the communication device. In other words, the determination of a mobile station's or tagged object's location can use the acquisition of measurement parameters such as the received signal strength (RSS) and/or time delay (TD) from a wireless frame exchange between the mobile station or tagged object and a set of usually three responding stations with fixed and known position. The location of the mobile station or tagged object can then be estimated or derived from the information.

The apparatus or method avoids the disadvantages of using access points for location sensing functions.

The processing unit can be an integral to the communication device, also referred to as station, which has the advantage that then the station itself can determine its position. This might be helpful for a user with a mobile computer as communication device in order to communicate the user's whereabouts.

The communication device can be a tag or wireless tag device that is easily attachable to goods. The location of the good can then be determined nearly exactly within a building or a defined area.

The transponder units, also called location transponder units, as well as wireless tags representing a low-cost and battery-saving application for tracking objects are able to operate on a reduced protocol stack and without a host system attached thus minimizing cost and protocol overhead. Each transponder unit or wireless tag can comprise a reduced set of PHY-layer (physical layer), MAC-layer (medium access layer), and logical-link-control facilities which can be adapted and designed to the applications. This allows to provide several configurations of cost-effective transponder units or wireless tags.

For localizing regular wireless local-area network (WLAN) stations supporting the full protocol stack a set of low-cost transponder units of a first type, also referred to as first transponder unit or type, operating on a drastically reduced protocol stack can be applied. Each first transponder type only acknowledges incoming unicast data frames transmitted by regular stations for sensing purposes. This requires no association with an access point thus minimizing protocol overhead.

For localizing wireless tags a set of second transponder units, each also referred to as second transponder unit or type, can be used. This set of second transponder types is able to execute a fuller protocol stack and is associated with an access point within audible range. The wireless tags can be implemented with a transmitter function only emitting multicast frames at regular intervals addressed to a group address belonging to all second transponder types. This allows a very low-cost and battery-saving implementation.

A combination of first and second transponder types for supporting both regular WLAN stations and wireless tags can lead to combined applications.

An access point unit can be coupled to the transponder units, wherein the access point unit receives information from the transponder units and forwards the information to the processing unit. This shows the advantage that a single access point unit is sufficient for the location determination of the communication device in that the access point unit is used for communicating further the information of the transponder units.

Moreover, the access point unit can be coupled to the transponder units via the communication device and receives information from the transponder units via the communication device. By doing so the access point unit communicates only with the communication device.

The at least two transponder units, the communication device, and the access point unit can form a basic service set that provides sufficient information for the determination of the location of the communication device within the coverage area.

Having three or more transponder units within the coverage area increases the precision of the location determination.

The derivation of the location of the communication device can comprise a triangulation method or a signature method. The signature method is the preferred method as it is easier to be performed and the signature method is usually applied when installing access point units anyway.

When referring to location-aware applications then applications, for example, are intended in the fields of:

Enterprise
Offering services and resources on a location-aware basis such as indication of available data rates depending on user location
Location finding tool to keep track of wireless laptops, personal digital assistants (PDA's) and tagged objects
Increase of wireless security by defining user zones for access, thus preventing wireless hacking from outside the access area Retail
Department store and shopping mall management to track visitor behavior
Direct offers and promotions based on visitor location
Tracking expensive wireless-tagged objects
Healthcare
Tracking patients carrying wireless alarming systems for emergency
Tracking hospital professionals carrying PDA's
Tracking of mobile hospital equipment such as wheelchairs
Public
Navigation through exhibitions with location enabled PDA's
Information of tagged objects available on PDA's

DESCRIPTION OF THE DRAWINGS

Preferred embodiments of the invention are described in detail below, by way of example only, with reference to the following schematic drawings.

The drawings are provided for illustrative purpose only and do not necessarily represent practical examples of the present invention to scale.

DETAILED DESCRIPTION

Figure 1:
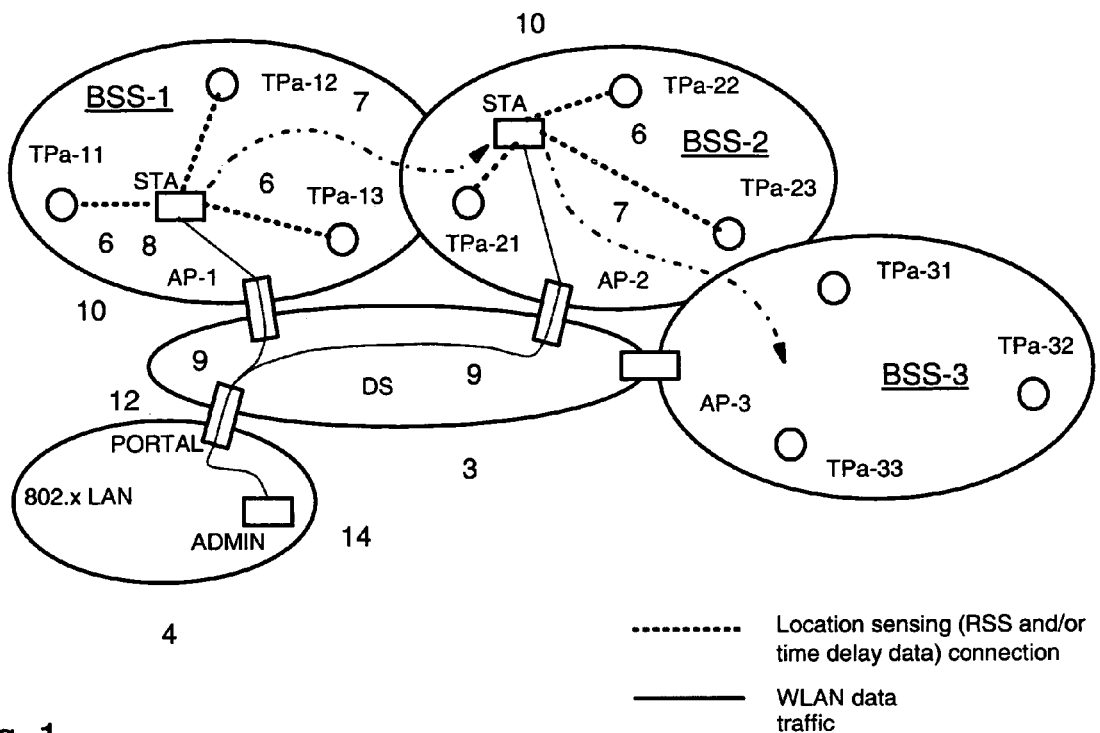
FIG. 1 shows a schematic illustration of a communication environment in accordance with a first embodiment of the present invention.

With reference to FIG. 1, a general layout of a communication environment is described in which a location transponder subsystem for localizing wireless local-area network (WLAN) communication devices can be used. In the figures, same reference signs are used to denote the same or like parts. Before embodiments of the present invention are described, some basics, in accordance with the present invention, are addressed.

The location of a communication device, i.e. a mobile station or tag, can be determined by using a triangulation method or a signature method.

The triangulation method is based on the trigonometric calculation of the sought position by taking the estimated line-of-sight propagation distances between mobile station and fixed responding stations into account. The estimated propagation distances can be derived from either line-of-sight propagation time measurements (TD) or from a wireless channel attenuation model estimating the propagation distance from measured received signal strength (RSS) data.

The signature method uses an initial site survey where RSS and/or time delay (TD) data are first gathered with an automated wireless recording device from each accessible responding station, and for each location of interest. For estimating the position of a mobile station providing a set of measured RSS and/or TD parameters, the most likely location is found by searching for the location with the best parameter match in a prerecorded signature database.

The following embodiments of the location transponder subsystem are described here with respect to the IEEE 802.11 media access (MAC) WLAN standard.

FIG. 1 shows a schematic illustration of a communication environment with a WLAN architecture in accordance with a first embodiment of the present invention. FIG. 1 shows a first access point AP-1 connected to a communication device 10, hereafter also referred to as client station or station 10 and labeled with STA, forming a first basic service set BSS-1. The first access point AP-1 provides wireless access within a dedicated area or cell, i.e. the coverage area, for data traffic to and from the first station 10 that is associated with the first access point AP-1 via a WLAN data connection 8. The station 10 is here surrounded by three first transponder units TPa-11, TPa-12, TPa-22, whereby the first transponder units TPa-11, TPa-12, TPa-13 are prearranged within the coverage area of the first basic service set BSS-1 and are adapted to communicate with the station 10 via a location sensing connection 6. The first transponder units TPa-11, TPa-12, TPa-13 are located at fixed and optimized positions to provide good location-sensing results.

As the station 10 is a mobile station, it moves along a path 7 to the coverage area of a second basic service set BSS-2. The second basic service set BSS-2 comprises here a second access point AP-2 and further first transponder units TPa-21, TPa-22, TPa-23. Moreover, FIG. 1 indicates a third basic service set BSS-3 having a third access point AP-3 and further first transponder units TPa-31, TPa-32, TPa-33 where the station 10 can move from the second basic service set BSS-2.

Each access point AP-1, AP-2, AP-3 is connected to a distribution system 3. The distribution system 3 is responsible for transporting via a distribution connection 9 information to the correct access point AP-1, AP-2, AP-3 for further distribution to the station 10 thus forming an extended basic service set (ESS). The distribution system 3 is further connected via a portal 12 to a conventional wired IEEE 802.x LAN (local area network) 4 comprising a WLAN administrator station or location server having a processing unit 14 that derives the location of the station 10 within the coverage area. However, the processing unit 14 for determining the location of station 10 can also be located in station 10 itself thus allowing self-initiated position estimates. Mobile stations, such as station 10, moving from one basic service set BSS to another are handed over by exchanging frames establishing associations or reassociations with the respective access points AP-1, AP-2, AP-3.

For the sake of simplicity, the first transponder units TPa-11, TPa-12, TPa-13; TPa-21, TPa-22, TPa-23; TPa-31, TPa-32, TPa-33 are indicated in the following as first transponder units TPa-nm where a indicates the first transponder type, and n, m are indices for identifying the access point AP-1, AP-2, AP-3 and transponder number, respectively.

For obtaining a location of the station 10, the first transponder units TPa-nm operate on a reduced protocol stack allowing only the acknowledgment of unicast data frames addressed to a particular first transponder unit TPa-nm to provide location-sensing information. The flow of location-sensing information is illustrated with a message sequence chart as shown and described with reference to FIG. 7.

Figure 2:
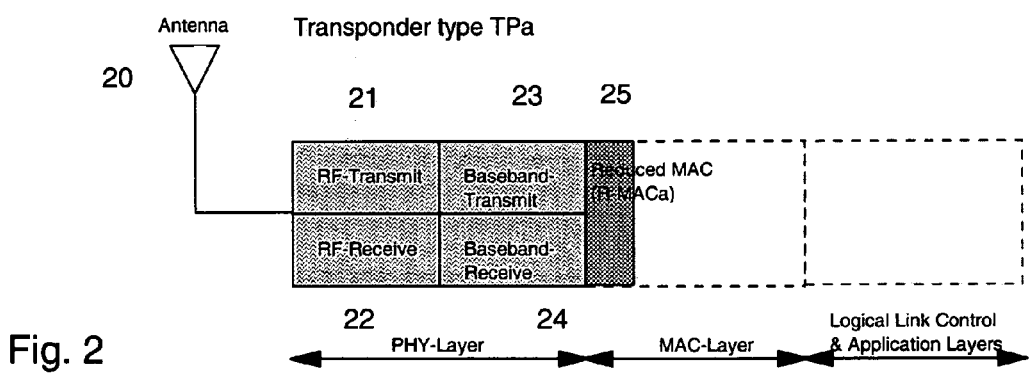
FIG. 2 shows a schematic illustration of a first transponder unit that is usable in the communication environment as shown in FIG. 1.

FIG. 2 shows a schematic illustration of an architecture of such a first transponder unit TPa-nm which is usable within a set of first transponder units TPa-nm in the communication environment as shown in FIG. 1. The first transponder unit TPa-nm comprises a first transponder antenna 20 and the circuitry for performing physical layer (PHY) functions by an RF-Transmit unit 21 and RF-Receive unit 22, a Baseband-Transmit unit 23 and Baseband-Receive unit 24 for transmitting and receiving radio signals according to the IEEE 802.11x standard. The measurement of received signal strength (RSS) is performed in the PHY-layer and is part of the IEEE 802.11x standard. In addition the first transponder unit TPa-mm comprises a reduced a-type MAC stack (R-MACa) unit 25, which is implemented with a microprocessor or a field programmable gate array (FPGA). The function of R-MACa is to filter incoming data frames for error-free reception and correct MAC address, and to pass an acknowledgement frame (ACK) after a short interframe space (SIFS) to the PHY-layer for transmission. In addition the first transponder unit TPa-nm may be equipped with additional circuitry for transmitting the ACK frame after exactly a SIFS time thus allowing distance estimates to be made based on propagation time between the station 10 and the first transponder unit TPa-nm. The additional circuitry for performing time delay measurements is described in the patent application with Application No. 02009752.3 of the European Patent Office, entitled "Geolocation; Subsystem", filed on 30 Apr. 2002, presently assigned to the assignee of the instant application and the disclosure of which is incorporated herein by reference. Alternatively other frame types such as Request-to-Send (RTS) and Clear-to-Send (CTS) to trigger a transponder response are possible.

Figure 3:
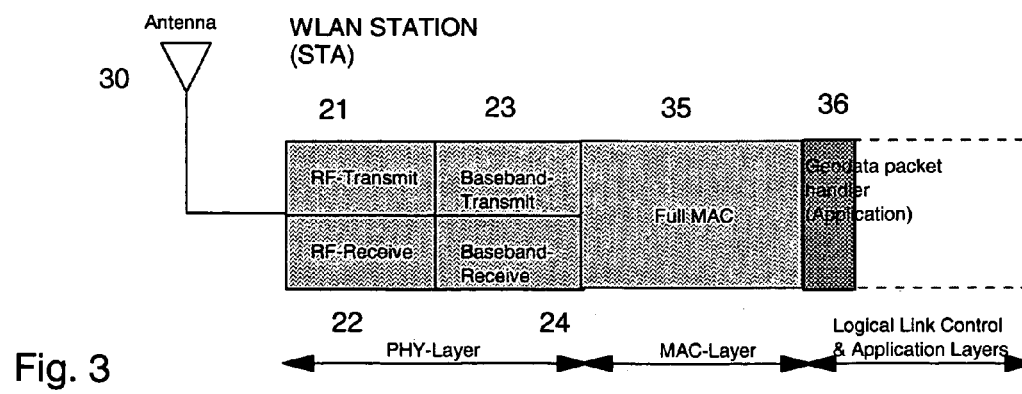
FIG. 3 shows a schematic illustration of a station that is usable in the communication environment as shown in FIG. 1.

FIG. 3 shows a schematic illustration of an architecture of the station 10 whose position is to be determined and which station 10 is usable in the communication environment as shown in FIG. 1. The station 10 is equipped with the full implementation of the PHY and MAC layer as proposed by the IEEE 802.11x standard. The station 10 comprises a station antenna 30 and the circuitry for performing physical layer (PHY) functions, which are usually contained in a WLAN adapter card. The physical layer (PHY) function are performed by the RF-Transmit unit 21 and RF-Receive unit 22, the Baseband-Transmit unit 23 and Baseband-Receive unit 24 for transmitting and receiving radio signals according to the IEEE 802.11x standard. In addition the station 10 includes a MAC stack unit 35, which is implemented with a host microprocessor system, and a Geodata packet handler software module 36 which is executable in the host microprocessor system of the station 10. This software module 36 is able to recognize a location command embedded in a data frame received from the access points AP-1, AP-2, AP-3 comprising a set of MAC addresses of the first transponder units TPa-nm which are likely within range, and information indicating on which channel the first transponder units TPa-nm operate. A flow of location-sensing information is illustrated in more detail with a message sequence chart as shown and described with reference to FIG. 7. In general upon reception of a location command the station 10 transmits 0-data frames addressed to the individual first transponder unit TPa-nm. For each ACK received from the first transponder units TPa-nm the received signal strength (RSS) is logged together with the MAC address of the first transponder unit TPa-nm. If the station 10 is also equipped with the circuitry for measuring time delays, as referenced above, the time delay is also logged. After receiving all acknowledgments, or after a time-out, the logged data are assembled, provided with a timestamp, and sent to the processing unit 14 in the WLAN administrator via the respective access point AP-1, AP-2, AP-3. Alternatively other frame types such as Request-to-Send (RTS) and Clear-to-Send (CTS) to trigger a transponder response are possible.

Figure 4:
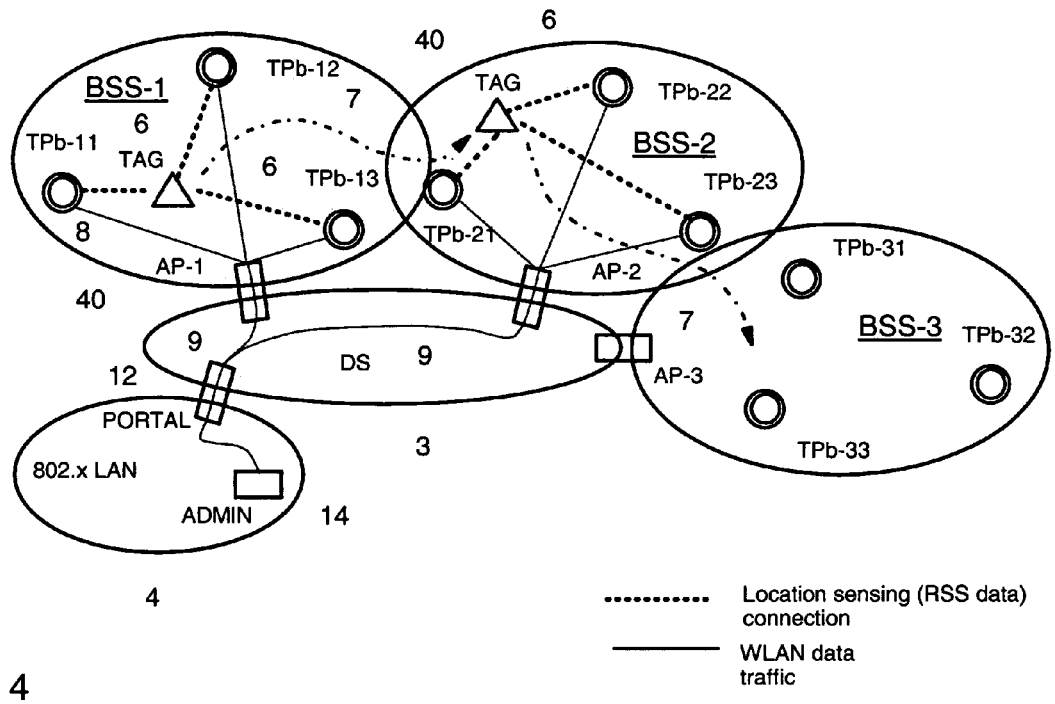
FIG. 4 shows a schematic illustration of a communication environment in accordance with a second embodiment of the present invention.

FIG. 4 shows a schematic illustration of a communication environment with a IEEE 802.11 architecture in accordance with a second embodiment of the present invention for localizing tagged objects. The setup for the second embodiment is similar to the first embodiment shown and described with reference to FIG. 1. The second embodiment differs from the first embodiment in that the station 10 is replaced by a tag 40 referring to, an tagged object and the first transponder units TPa-nm are replaced by second transponder units TPb-nm. The second transponder units are indicated with TPb-nm where b indicates the second transponder type, and n, in are indices for identifying the access point AP-1, AP-2, AP-3 and transponder number, respectively. The second transponder units TPb-nm operate on a reduced protocol stack but allowing in addition an association with one access point AP-1, AP-2, AP-3 for relaying location-sensing information. For that, the communication between the second transponder units TPb-nm and the respective access points AP-1, AP-2, AP-3 is performed directly via the WLAN data connection 8 whilst the location sensing connection 6 is performed between the second transponder units TPb-nm and the tag 40. The flow of location-sensing information is illustrated in more detail with a message sequence chart as shown and described with reference to FIG. 8.

Figure 5:
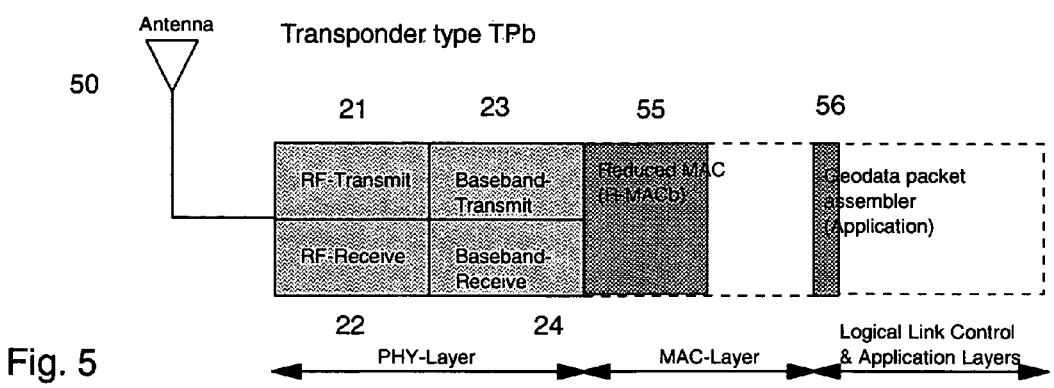
FIG. 5 shows a schematic illustration of a second transponder unit that is usable in the communication environment as shown in FIG. 4.

FIG. 5 shows a schematic illustration of an architecture of one second transponder unit TPb-nm which is usable within a set of second transponder units TPb-nm in the communication environment as shown in FIG. 4. The second transponder unit TPb-nm of type TPb comprises a second transponder antenna 50 and the circuitry performing physical layer (PHY) functions by the RF-Transmit unit 21 and RF-Receive unit 22, the Baseband-Transmit unit 23 and Baseband-Receive unit 24 for transmitting and receiving radio signals according to the IEEE 802.1x standard. In addition the second transponder unit TPb-nm includes a reduced b-type MAC stack (R-MACb) unit 55, which is implemented with a microprocessor. The function of R-MACb is to enable data traffic according to IEEE 802.11x between the second transponder unit TPb-nm and the access point AP-1, AP-2, AP-3, with which it is associated. In addition R-MACb is able to receive multicast frames from the tag 40 or further wireless tags with group address valid for all second transponder units TPb-nm. Furthermore the second transponder unit TPb-nm includes a Geodata packet assembler software module 56 which may be executable in the microprocessor responsible for operating R-MACb. The function of this Geodata packet assembler software module 56 is to record RSS, tag MAC address and timestamp of each multicast frame received from second transponder units TPb-nm on the corresponding channel during a listening period defined by a timer (not shown). After expiration of the timer the recorded data are assembled and sent to the processing unit 14 of the WLAN administrator station via the respective access point AP-1, AP-2, AP-3 on the corresponding channel. After transmitting the data to the access point AP-1, AP-2, AP-3 the listening period is resumed. The listening periods are of comparable duration but unsynchronized with other transponder units or wireless tags.

In a further embodiment third transponder units (not shown) can be applied. The third transponder units are here indicated with TPc-nm where c indicates the third transponder type, and n, m are indices for identifying the access point AP-1, AP-2, AP-3 and transponder number, respectively. The third transponder units TPc-nm are used for localizing an external station visiting the location-enabled, WLAN or violating the protocol, said external station is not equipped with the Geodata packet handler software module 36. The third transponder units TPc-nm support the full WLAN protocol or protocol stack to participate in the normal data exchange service in accordance with the IEEE 802.11x standard. The communication between the third transponder units TPc-nm and the respective access points AP-1, AP-2, AP-3 is performed also directly via the WLAN data connection 8 whilst the location sensing connection 6 is performed between the third transponder units TPc-m and the external station. The third transponder units TPc-nm are also adapted to receive and interpret commands from the processing unit 14 of the WLAN administrator station to localize the external station identified by its MAC station address. For that each third transponder unit TPc-m sends a 0-data frame to this external station which then responds with an ACK frame. For each ACK received from the external station the RSS data is logged together with the MAC address of the external station. The gathered and assembled information comprising the MAC address of external station, RSS data, and timestamp are forwarded via the associated access point AP-1, AP-2, AP-3 to the processing unit 14 of the WLAN administrator station for location determination of the external station.

Figure 6:
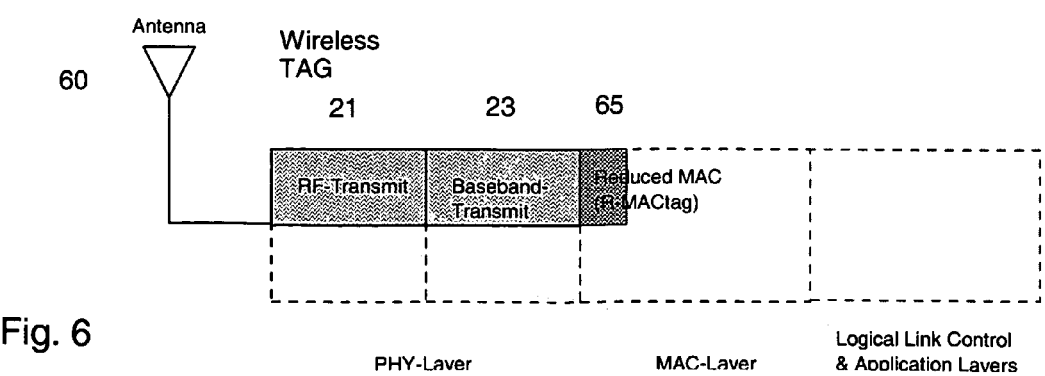
FIG. 6 shows a schematic illustration of a tag that is usable in the communication environment as shown in FIG. 4.

FIG. 6 shows a schematic illustration of an architecture of one tag 40 whose position is to be determined, whereby the tag 40 is usable in the communication environment as shown in FIG. 4.

The tag 40 is equipped with only the implementation of the PHY layer. That means the tag 40 comprises a second transponder antenna 60 and the circuitry for performing physical layer (PHY) functions by the RF-Transmit unit 21 and Baseband-Transmit unit 23 for transmitting radio signals according to the IEEE 802.11x standard. In addition the tag 40 includes a reduced tag MAC stack (R-MACtag) unit 65, which is implemented with a microprocessor or FPGA. The function of R-MACtag is to pass a multicast frame addressed to the group of all second transponder units TPb-nm to the PHY layer for transmission at regular intervals controlled by an unsynchronized timer "TAG". After transmitting each multicast frame the tag circuitry enters a sleep mode to conserve battery power. The body of the multicast frame is either empty or may comprises additional tag information such as the power status of the battery. Preferably all multicast frames are transmitted on the same channel for the entire site installation.

Location Sensing for WLAN Stations Using Transponder Type TPa

Figure 7:
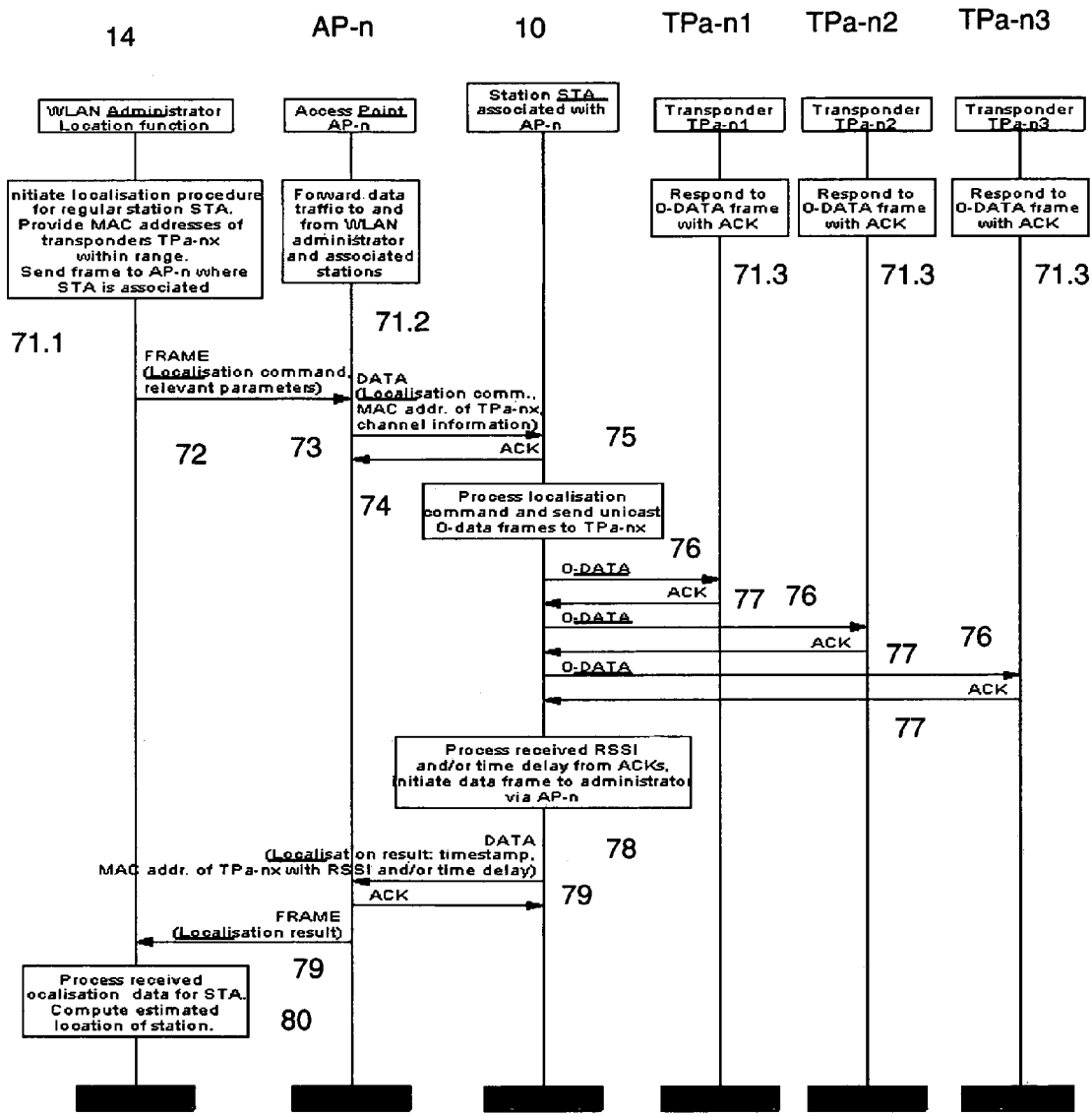
FIG. 7 shows a schematic illustration of a signal flow in a message sequence chart for locating regular stations by using first transponder units.

FIG. 7 shows a schematic illustration of a signal flow of location-sensing information in a message sequence chart for locating regular stations, such as station 10, by using first transponder units TPa-nm. The message sequence chart shows at the top the set of communicating entities with vertical bars indicating the tasks to be performed. Time increases along the bars in the downward direction. From left to right the set of communicating entities indicates the processing unit 14 of the WLAN administrator station, the access point AP-n, the station 10, and three first transponder units TPa-n1, TPa-n2, TPa-n3. Initiation of the localization process for a given station 10 is started at an location function module in the processing unit 14, as indicated with box 71.1. The access point AP-n is ready to forward data traffic to and from the processing unit 14 and associated stations, as indicated with box 71.2. The first transponder units TPa-n1, TPa-n2, TPa-n3 are prepared to respond to an 0-data frame with an ACK-frame, as indicated with boxes 71.3. An information frame is sent, as indicated by arrow 72, to the respective access point AP-n where the station is currently associated. The information frame carries all information to identify the message as a localization command, as well as MAC addresses and channel information of all first transponder units TPa-mm within possible range of the corresponding access point AP-n. The information frame is then further routed, as indicated by arrow 73, via the access points AP-n to the corresponding station 10 using the IEEE 802.11 protocol. As indicated with box 74, the station 10 initializes upon reception of the frame the resident Geodata packet handler software module 36 and transmits after an acknowledgment ACK, as indicated by arrow 75, a sequence of unicast 0-data frames addressed to the corresponding first transponder units TPa-nx on the corresponding channels, as indicated by arrows 76. Upon reception of each ACK-frame, that is indicated by arrows 77, the corresponding RSS and/or TD parameter is logged, as indicated with box 78. The Geodata packet handler software module 36 further builds the body of a data frame comprising the received localization information comprising the MAC address, RSS and/or TD parameter, and timestamp for each received response. The data frame is then routed to the localization function module in the processing unit 14 at the WLAN administrator station, as indicated with arrows 79. Here, i.e. at the processing unit 14, the received data are processed to calculate a position estimate based on the triangulation or signature method, as indicated with box 80. Alternatively the location function module in the processing unit 14 at the WLAN administrator station can be resident in the station 10 itself thus allowing self-initiated position estimates.

LOCATION SENSING FOR WIRELESS TAGGED OBJECTS USING TRANSPONDER TYPE TPb

Figure 8:
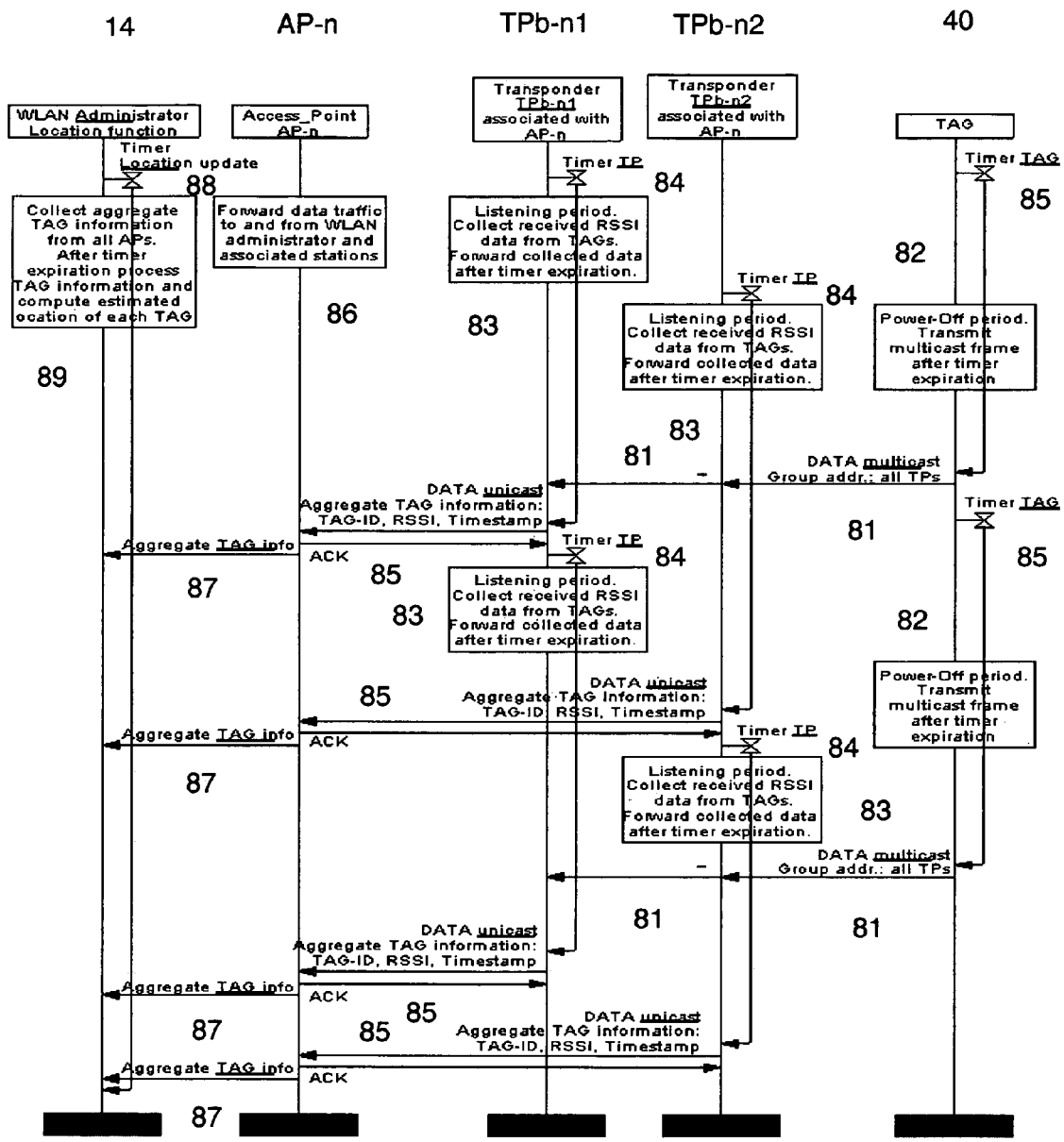
FIG. 8 shows a schematic illustration of a signal flow in a message sequence chart for locating tagged objects by using second transponder units.

FIG. 8 shows a schematic illustration of a signal flow of location-sensing information in another message sequence chart for locating tagged objects by using second transponder units TPb-nm. Location sensing is preferably performed on a continuous basis to provide running updates of tagged objects such as with the tag 40. The message sequence chart shows at the top the set of communicating entities with vertical bars indicating the tasks to be performed. Time increases along the bars in the downward direction. From left to right the set of communicating entities indicates the processing unit 14, the access point AP-n, two second transponder units TPb-n1, TPb-n2, and the tag 40. After every timer expiration, e.g. every minute, the tag 40 transmits a multicast frame with a group address valid for reaching all installed second transponder units TPb-nm, as indicated with arrows 81. The information transmitted is the source MAC address identifying the tag 40. Additional information about the tag identity may be comprised of the body of the multicast frame. After every transmission the tag circuitry resumes a power-saving mode and restarts the timer, as indicated with boxes 82.

The second transponder units TPb-nm periodically enter a listening interval on the channel where the tag 40 or tags is/are transmitting, as indicated with boxes 83. This is controlled by an unsynchronized transponder timer 84, also labeled with "TP", with similar timing interval as a tag timer 85, also labeled with "TAG". During listening intervals RSS and source address from received multicast frames are logged. After timer expiration the logged data are assembled into an aggregate tag information body comprising the individually received tag-IDs, RSS, and timestamp, which is then forwarded to the associated access point AP-n, as indicated with arrows 85. The associated access point AP-n is prepared to forward the data traffic to and from the processing unit 14, as indicated with box 86. The aggregate tag information from each second transponder unit TPb-nm is then further routed, as indicated by arrows 87, to the location function module responsible for processing wireless tag information at the processing unit 14 of the WLAN administrator station. All second transponder units TPb-nm operate independently and without mutual synchronization. At periodic intervals controlled by a location update timer 88, also labeled with "Location update", the location function module performs calculations of the estimated position based on the data received from each tag 40, as indicated with box 89.

The functions of the three types of transponder units TPa-nm, TPb-mn, TPc-mn, i.e. first transponder units TPa-nm, second transponder units TPb-mn, and third transponder units TPc-mn, can be combined to allow all modes of operation.

The location function module supporting the WLAN location function is preferably resident in the processing unit 14 at the WLAN administrator station. It is responsible for managing the location system, for building up and maintaining a database of prerecorded RSS and/or TD values during the initial site survey, for initiating and processing localization requests on an individual or periodic basis, and for calculating and displaying location estimates.

An experiment for assessing the positioning accuracy with RSS data was conducted using IEEE 802.1b WLAN devices. A section of a building covered by the radio signals of access points AP-n was used. Five first transponder units TPa-nm were deployed at different locations. Contour lines, marked with measured RSS values (in-dBm), showing the available RSS for the first transponder units TPa-nm were plotted. A grid network with 2.8 m spacing was indicating the locations where RSS values from all five first transponder units TPa-nm were recorded thus providing the database for subsequent position estimates (signature method). The positioning algorithm was used to compare the five RSS samples measured by the station whose position is to be determined with the prerecorded database. The estimated position was obtained by finding interpolated grid points providing the best match with the measured RSS samples. Typical results show a positioning accuracy of 0.5 m. On average a positioning accuracy of 1 m-2 m can be achieved.

Any disclosed embodiment may be combined with one or several of the other embodiments shown and/or described. This is also possible for one or more features of the embodiments.

We claim:

1. An apparatus comprising means for determining the geolocation of a wireless communication device within a wireless network, the means for determining comprising:
   at least two transponder units with a reduced medium access control stack unit being reduced to comprise allowing only acknowledgment of unicast data frames addressed to a particular one of said transponder units to provide location-sensing information, and for communicating with the communication device when the communication device is situated in a coverage area of the wireless network; and
   a processing unit for deriving the geolocation of the communication device within the coverage area in dependence on information received from the transponder units, wherein one transponder unit comprises a reduced a-type medium access (a-type MAC) stack unit implemented with one of a microprocessor and a field programmable gate array, said a-type medium access (a-type MAC) stack unit to filter incoming data frames for error-free reception and correct MAC address, and to pass an acknowledgment frame after a short interframe space to a physical-layer (PHY-layer) for transmission.

2. An apparatus as claimed in claim 1, wherein the processing unit is integral to the communication device.

3. An apparatus as claimed in claim 1, wherein the communication device is a wireless tag with a reduced tag medium access control stack unit reduced to comprise passing a multicast frame addressed to a group of said transponder units at regular intervals controlled by an unsynchronized timer.

4. An apparatus as claimed in claim 1 comprising three transponder units within the coverage area.

5. A network comprising an apparatus as claimed in claim 1.

6. An apparatus as claimed in claim 1, further comprising an access point unit coupled to the transponder units, wherein the access point unit receives information from the transponder units and forwards the information to the processing unit.

7. An apparatus as claimed in claim 6, wherein the access point unit is coupled to the transponder units via the communication device and receives information from the transponder units via the communication device.

8. An apparatus as claimed in claim 6, wherein the at least two transponder units, the communication device, and the access point unit form a basic service set.

9. A method comprising determining the geolocation of a wireless communication device within a wireless network, the step of determining comprising the steps of:
   arranging at least two transponder units with a reduced medium access control stack unit being reduced to comprise allowing only acknowledgment of unicast data frames addressed to a particular one of said transponder units to provide location-sensing information, and for communicating with the communication device when the communication device is situated in a coverage area of the wireless network;
   receiving information from the transponder units; and
   deriving the location of the communication device within the coverage area in dependence on the received information,
   wherein one transponder unit comprises a reduced a-type medium access (a-type MAC) stack unit implemented with one of a microprocessor and a field programmable gate array, said a-type medium access (a-type MAC) stack unit to filter incoming data frames for error-free reception and correct MAC address, and to pass an acknowledgment frame after a short interframe space to a physical-layer (PHY-layer) for transmission.

10. A method as claimed in claim 9, wherein the step of deriving the location of the communication device comprises one of a triangulation method and a signature method.

11. A method as claimed in claim 9, wherein the communication device is a wireless tag with a reduced tag medium access control stack unit being reduced to pass a multicast frame addressed to a group of said transponder units at regular intervals controlled by an unsynchronized timer.

12. A method as claimed in claim 9, wherein the step of arranging arranges three transponder units within the coverage area.

13. A method as claimed in claim 9, farther comprising coupling an access point unit to the transponder units, and the access point unit receiving information from the transponder units and employing the information in the step of deriving.

14. A method as claimed in claim 13, wherein the access point unit is coupled to the transponder units via the communication device and farther comprising the access point unit receiving information from the transponder units via the communication device.

15. A method as claimed in claim 13, wherein the at least two transponder units, the communication device, and the access point unit form a basic service set.

* * * * *